US005634427A

United States Patent [19]

Rollins

[11] Patent Number: 5,634,427
[45] Date of Patent: Jun. 3, 1997

[54] EMERGENCY SIGNALLING DEVICE

[76] Inventor: Frances J. Rollins, 2723 E. Whidby La., Anaheim, Calif. 92806

[21] Appl. No.: 436,123

[22] Filed: May 8, 1995

[51] Int. Cl.[6] .............................. B64B 1/50; G09F 21/06

[52] U.S. Cl. .............................. 116/210

[58] Field of Search .............................. 116/210, DIG. 8, 116/DIG. 9; 137/68.27; 62/293, 294; 206/0.6, 570, 573, 803; 220/260, 277, 278

[56] References Cited

U.S. PATENT DOCUMENTS

| | | | |
|---|---|---|---|
| 2,409,166 | 10/1946 | Tracy et al. | 116/210 X |
| 3,721,983 | 3/1973 | Sherer | 116/210 X |
| 3,874,325 | 4/1975 | Cocker, III | 116/210 |
| 3,877,096 | 4/1975 | Scegney . | |
| 3,881,531 | 5/1975 | Rossi . | |
| 3,929,091 | 12/1975 | Holder . | |
| 3,930,448 | 1/1976 | Barber et al. . | |
| 3,930,488 | 1/1976 | Crisstian . | |
| 3,941,079 | 3/1976 | McNeill . | |
| 3,945,338 | 3/1976 | Correa . | |
| 3,951,260 | 4/1976 | Frazee . | |
| 3,964,427 | 6/1976 | Murphy . | |
| 4,013,035 | 3/1977 | Kopeika . | |
| 4,020,786 | 5/1977 | Kopieka | 116/210 |
| 4,042,882 | 8/1977 | Camacho et al. . | |
| 4,044,711 | 8/1977 | Jamison . | |
| 4,048,565 | 9/1977 | Rice . | |
| 4,052,955 | 10/1977 | Haushalter . | |
| 4,088,162 | 5/1978 | Rossi . | |
| 4,094,267 | 6/1978 | Davis | 116/DIG. 9 |
| 4,102,296 | 7/1978 | Felix . | |
| 4,113,134 | 9/1978 | Heintzelman | 220/260 X |
| 4,114,561 | 9/1978 | Asaro . | |
| 4,120,259 | 10/1978 | Wilson . | |
| 4,123,987 | 11/1978 | Singerle et al. | 116/DIG. 8 |
| 4,125,233 | 11/1978 | Winker et al. | 244/33 |
| 4,178,867 | 12/1979 | Shyu | 116/210 X |
| 4,185,582 | 1/1980 | Bryant | 116/210 |
| 4,219,819 | 8/1980 | Patel | 116/210 X |
| 4,230,063 | 10/1980 | Chang | 116/63 T |
| 4,240,371 | 12/1980 | Perry | 116/210 |
| 4,281,427 | 8/1981 | Petters | 116/210 X |
| 4,295,438 | 10/1981 | Porter | 116/210 |
| 4,296,704 | 10/1981 | Bridge | 114/103 |
| 4,405,099 | 9/1983 | Bolen | 116/210 X |
| 4,416,212 | 11/1983 | Howard | 116/210 |
| 4,416,433 | 11/1983 | Bellina | 244/33 |
| 4,433,638 | 2/1984 | Ashline | 116/210 |
| 4,475,476 | 10/1984 | Howard . | |
| 4,494,714 | 1/1985 | Hill et al. | 244/98 |
| 4,495,878 | 1/1985 | Shieh | 441/80 |
| 4,499,763 | 2/1985 | Varkia | 73/170 R |
| 4,564,159 | 1/1986 | Hill et al. | 244/98 |
| 4,566,456 | 1/1986 | Koning et al. | 128/419 PG |
| 4,576,303 | 3/1986 | Mundt et al. | 220/89 A |
| 4,696,252 | 9/1987 | Grill | 116/210 |
| 4,697,706 | 10/1987 | Schaller | 206/573 |
| 4,768,739 | 9/1988 | Schnee | 244/146 |
| 4,800,835 | 1/1989 | Mears | 116/210 |
| 4,815,677 | 3/1989 | Rushing et al. | 244/33 |
| 4,836,128 | 6/1989 | Walker | 116/210 |
| 5,020,467 | 6/1991 | Van Patten . | |
| 5,042,748 | 8/1991 | Conn | 244/33 |
| 5,095,845 | 3/1992 | Murphy | 116/210 |
| 5,199,374 | 4/1993 | Blanchette | 116/209 |
| 5,231,952 | 8/1993 | Tenniewood . | |
| 5,245,943 | 9/1993 | Hull et al. | 116/202 |
| 5,301,631 | 4/1994 | Vining | 116/210 |
| 5,411,158 | 5/1995 | Kays et al. | 220/89.2 |

*Primary Examiner*—Daniel G. DePumpo
*Assistant Examiner*—Willie Morris Worth
*Attorney, Agent, or Firm*—Lee W. Tower

[57] ABSTRACT

An emergency signalling device is provided. The emergency signalling device includes a cylindrical canister pressurized with a quantity of a lighter than air gas. A valve is provided on the top of the canister for sealing the gas. An inflatable balloon is sealed to the top covering the valve. A cord is attached on one end to the canister and wrapped around the canister in a plurality of layers of cord, the combined canister and wrapped cord having a first diameter. A waxy substance secures the cord to the canister and each layer of the cord to adjacent layers of the cord. A loop forms a closed circle on the other end of the cord, the loop having a second diameter greater that the first diameter. In a specific embodiment the valve on the top for sealing the gas includes scoring on the top of the canister.

6 Claims, 5 Drawing Sheets

EMERGENCY SIGNALLING DEVICE

BACKGROUND OF THE INVENTION

1. Field of the Invention

This invention relates to an emergency signalling apparatus to be used by persons needing rescue. In particular the invention relates to a device for locating lost persons.

2. Description of the Related Art

Often when a person is lost, they are lost in an environment that makes it difficult for rescuers to find the person. For example, the environment can be a wooded or a forested area. Even in the case of a deforested area such as a desert, it can be difficult to spot a person who is lost. The delay in finding a lost person can be even more critical when the person has been injured. In that situation it is critical that the person be found as quickly as possible and given medical help. There are many other situations requiring search and rescue, including, for example, a boat adrift at sea due to engine failure or being out of fuel.

In the prior art, there are a number of search and recovery devices that include a deflated balloon which can be inflated by pressurized lighter than air gas carried in a cartridge. When the gas in the cartridge inflates the balloon, the balloon rises to a height observable by rescuers. Such a search and recovery device is described in U.S. Pat. No. 3,874,325, issued Apr. 1, 1975. In another emergency locating device, described in U.S. Pat. No. 3,941,079 issued Mar. 2, 1976, a reel is attached to a gas cylinder for inflating a balloon. The reel has a tether line disposed thereon and attached to the balloon. This device has the disadvantage that the reel adds weight and volume to the device.

U.S. Pat. No. 4,013,035 issued Mar. 22, 1977 describes a balloon signal assembly that includes an inflatable balloon capable of retaining a lighter than air gas connected to a container of gas under pressure. A needle is connected to the container for breaking the seal between the pressurized gas inside the container and the balloon, so that the balloon inflates. A disadvantage of this and similar devices is that a complicated valve assembly such as a needle connected to the container is required in order to provide a mechanism for breaking the seal between the pressurized container and the balloon. Some assemblies also have a valve which is provided to prevent re-entry of the gas from the balloon into the container. These complex assemblies add weight and raise the cost of the devices.

SUMMARY OF THE INVENTION

An object of the present invention is to provide an emergency signalling device that is relatively light to carry, is relatively easy to activate, and is easy to tether, even for an injured person. Another object of the present invention is to provide a convenient way for storing the tether before the emergency device is used. Another object of the present invention is to provide a signalling device attached to the container that can be observed or heard by rescuers. Yet another object of the invention is to provide a method of activating the emergency signalling device, which consists of a set of easily understood and easy to follow instructions.

According to the invention, an emergency signalling device is provided. The emergency signalling device includes a cylindrical canister pressurized with a quantity of a lighter than air gas. A valve is provided on the top of the canister for sealing the gas. An inflatable balloon is sealed to the top covering the valve. A cord is attached on one end of the canister and wrapped around the canister in a plurality of layers of cord. The canister and the cord wrapped around the canister have a first diameter. A waxy substance secures the cord to the canister and each layer of the cord to adjacent layers of the cord. A loop forms a closed circle on the other end of the cord, the loop having a second diameter greater than the first diameter. In a specific embodiment the valve on the top for sealing the gas includes scoring on the top of the canister.

Other objects and many of the attendant features of this invention will be more readily appreciated as the same becomes better understood by reference to the following detailed descriptions and considered in connection with the accompanying drawings in which like reference symbols designate like parts throughout the figures.

DETAILED DESCRIPTION

Figure 1B:
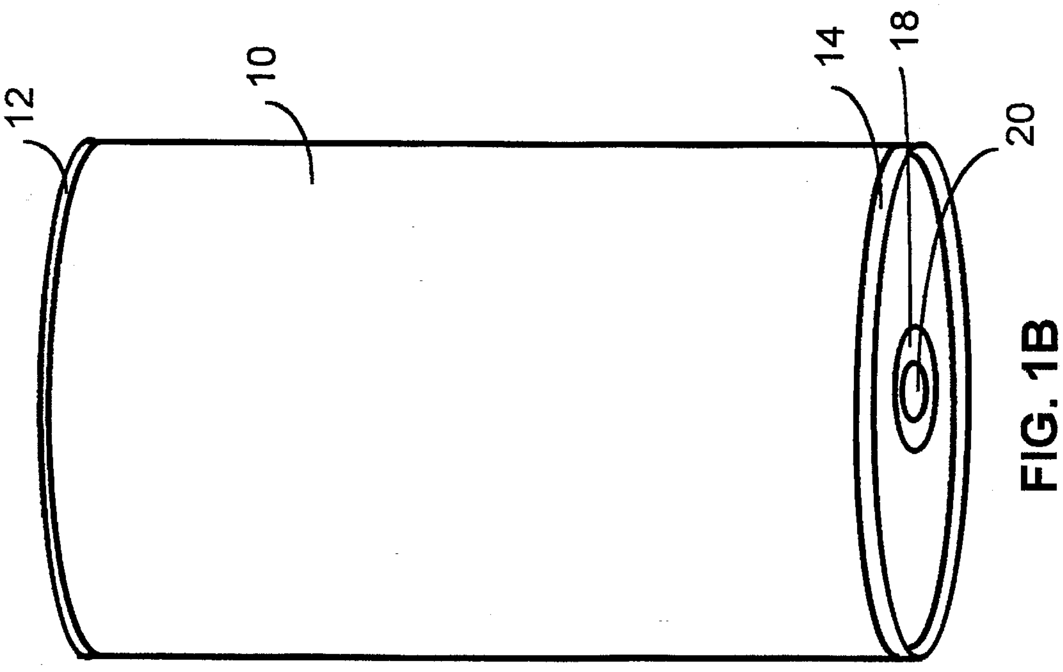
FIG. 1B is a perspective view showing the bottom and side of the canister having a signal device on the bottom according to the present invention.
Figure 1A:
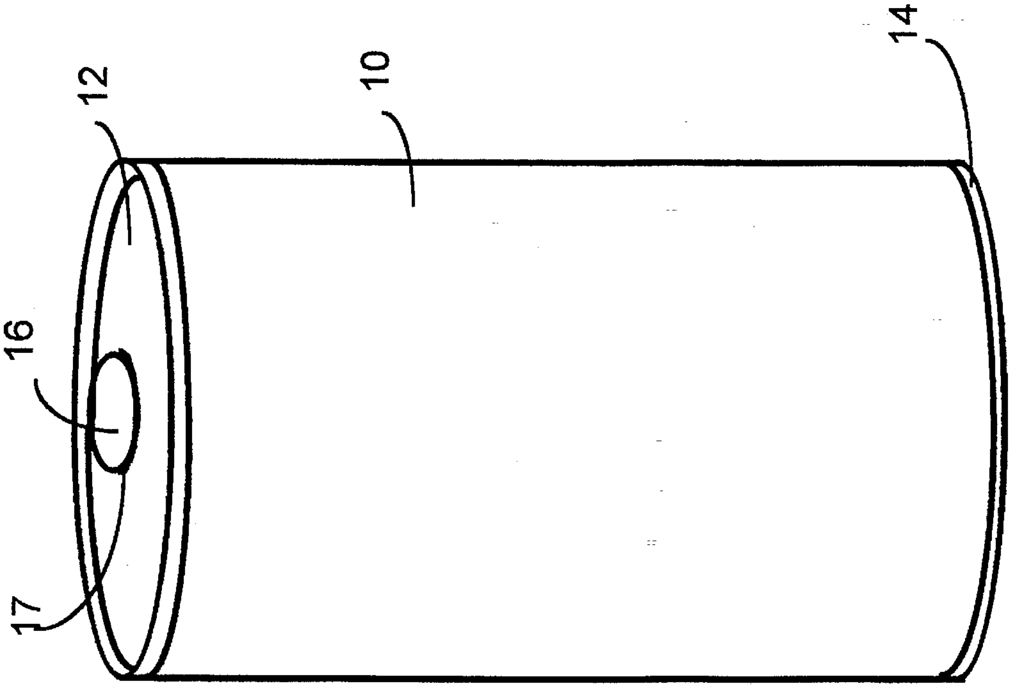
FIG. 1A is a perspective view showing the top and side of a canister having scoring in the top according to the present invention.

Referring now to the drawings and more particularly to FIG. 1, a canister 10 is shown having a top 12 and a bottom 14. The canister is preferably made of aluminum or another similarly light material. For example, the sidewalls of the canister can be aluminum or could be made of a composite material. The top of the canister can be made of aluminum and has a valve consisting of raised dome 16 and scoring 17 along the base of the dome 16. As will be described, the valve is between the lighter than air gas inside the canister 10 and a balloon attached to the top 12. When the pressurized canister 10 is struck against a hard surface, or the dome 16 is pushed down, the scoring 17, which is a weak area in the top 12, breaks and the lighter than air gas stored in the canister 10 is released into a balloon attached to the top 12.

FIG. 1B is a perspective view showing the bottom 14 of canister 10. Located on the bottom surface is a signal device 18 which is activated by pressing button 20. The signal device 18 can be a flashing light or can be a beeper or a buzzer. A signal device that is a light can be seen at a distance by rescuers.

Figure 2B:
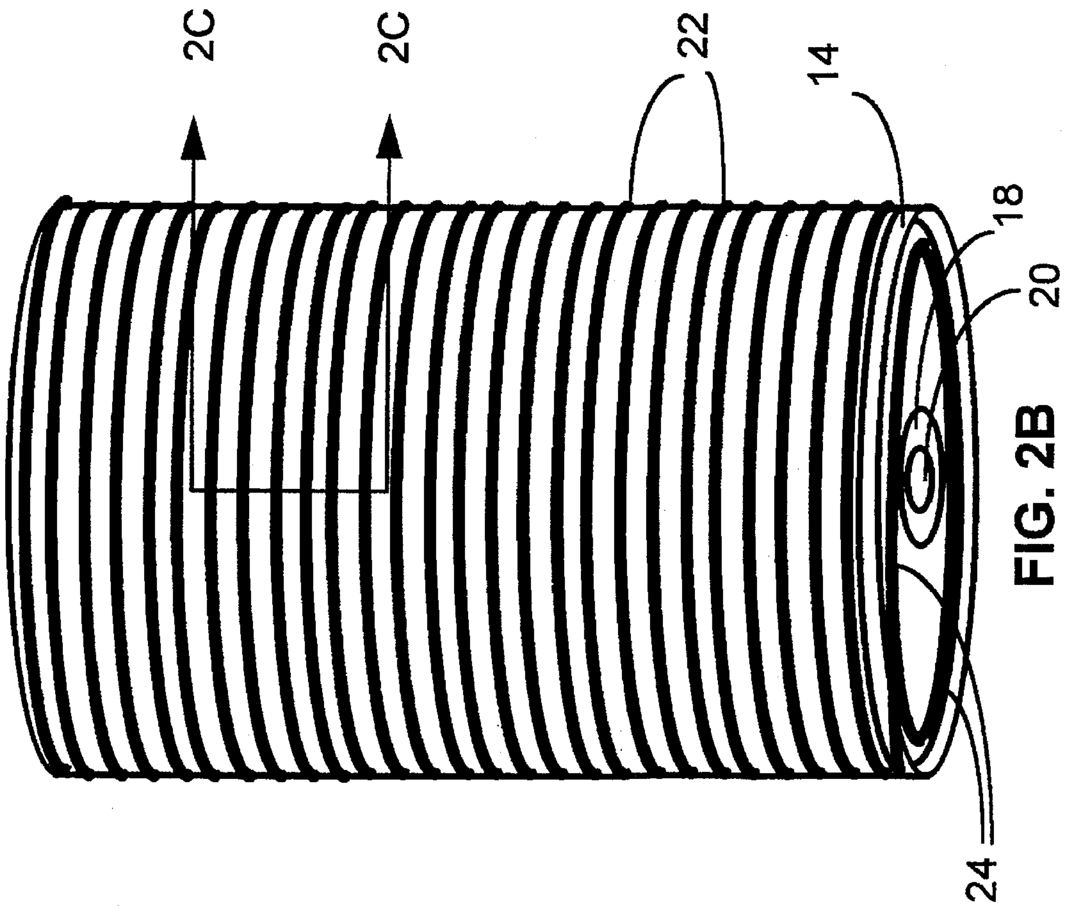
FIG. 2B is a perspective view showing the bottom and side of the canister having a cord wrapped around the canister and having a cord loop attached to the bottom according to the present invention.
Figure 2A:
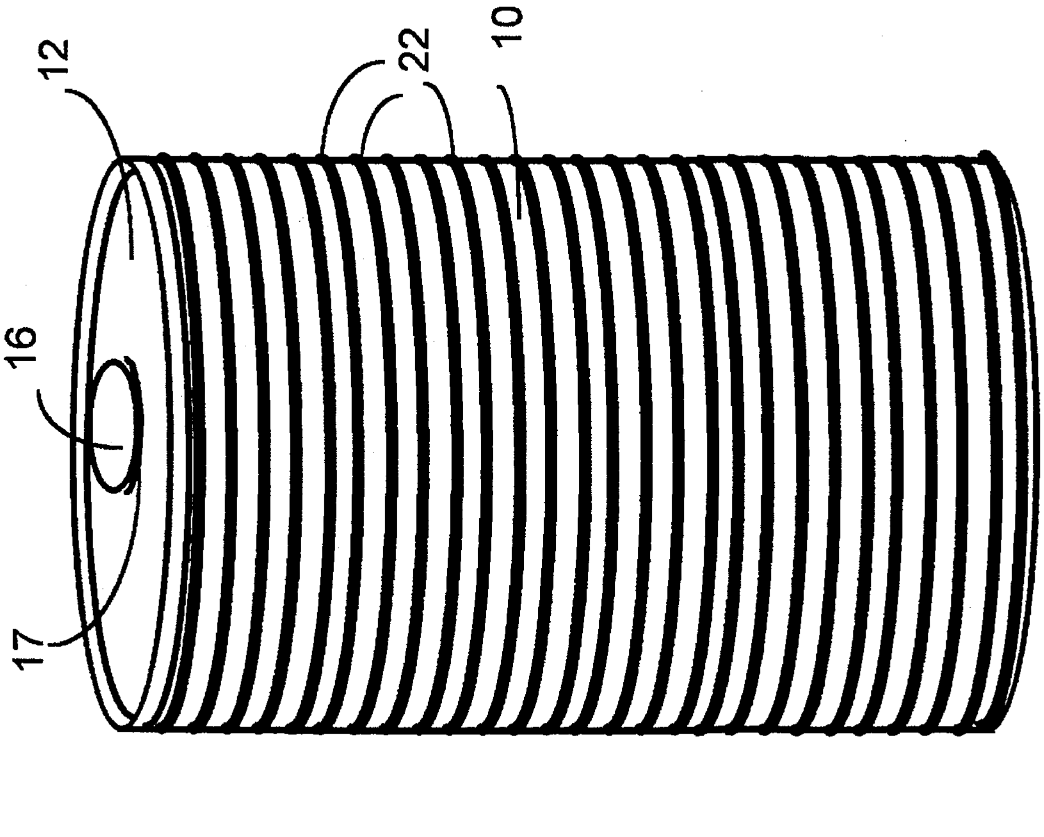
FIG. 2A is a perspective view showing the top and side of the canister having a cord wrapped around the canister according to the present invention.

As shown in FIG. 2A a cord 22 is wrapped around the canister 10. The cord is relatively long to allow the balloon to rise to a visible height and the cord is wrapped in layers around the canister 10. One end of the cord is attached to the canister. The other end of the cord has a loop 24, which is attached to the bottom of the canister. The loop forms a close circle and has a diameter larger than the combined diameter of canister 10 with layers of cord 22 wrapped thereon. Thus if the canister 10 plus the wrapped layers of cord 22 have a combined diameter of 3½ inches, then the loop is greater than 3½ inches in diameter.

Figure 2C:
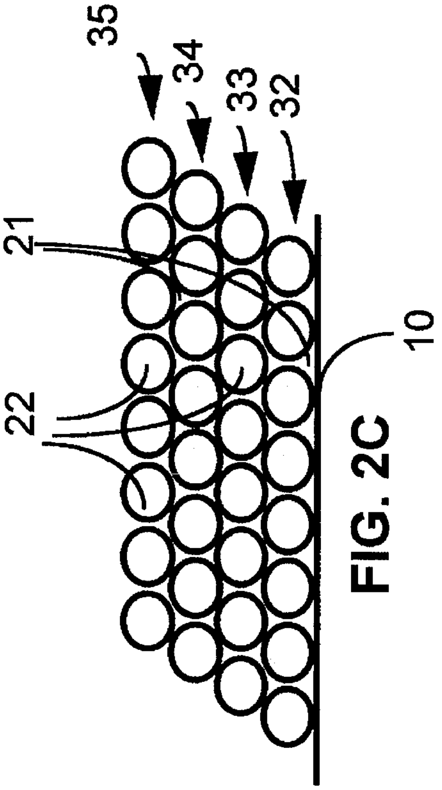
FIG. 2C is a section of the cord along line 2C—2C in FIG. 2B according to the present invention.

FIG. 2C is a section along line 2C—2C of FIG. 2B. As shown, the layers of cord 22 are wrapped around the canister 10 in layers, such as layers 32, 33, 34 and 35. The cord is secured to the canister by a waxy substance, such as paraffin or beeswax. The layers of the cord are attached to one another with the same waxy substance. This is indicated in FIG. 2C by element 21 which indicates that the waxy substance is between cords 22. The waxy substance secures the cord 22 to canister 10 and each layer of the cord to each other layer, such as layer 33 to layer 32. The waxy substance ensures that the cord will remain wrapped on the canister until the user wishes to deploy the emergency signalling device.

Figure 3A:
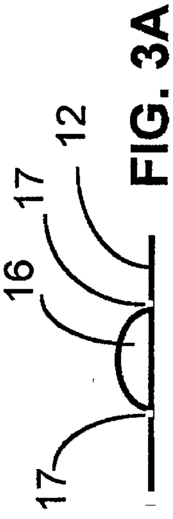
FIG. 3A is an elevation section view of the top of the canister showing the valve and scoring along the base of the valve according to the present invention.
Figure 3B:
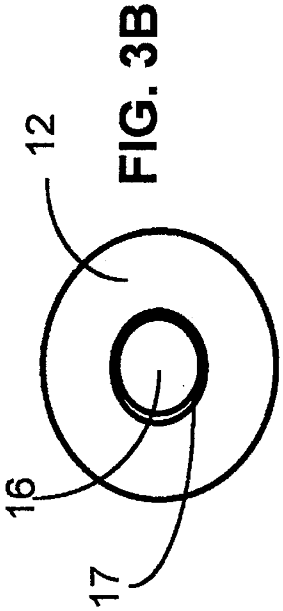
FIG. 3B is a top view of the canister showing the valve according to the present invention.

FIG. 3A is an elevation section view of the top 12 of the canister 10 showing the valve consisting of dome 16 and scoring 17 along the base of the dome. FIG. 3B is a top view of the canister showing that the scoring 17 is around the base of dome 16. The scoring 17 is a weak spot in top 12, which enables a user to open the valve, so that the gas inside canister 10 can inflate balloon 26.

Figure 4:
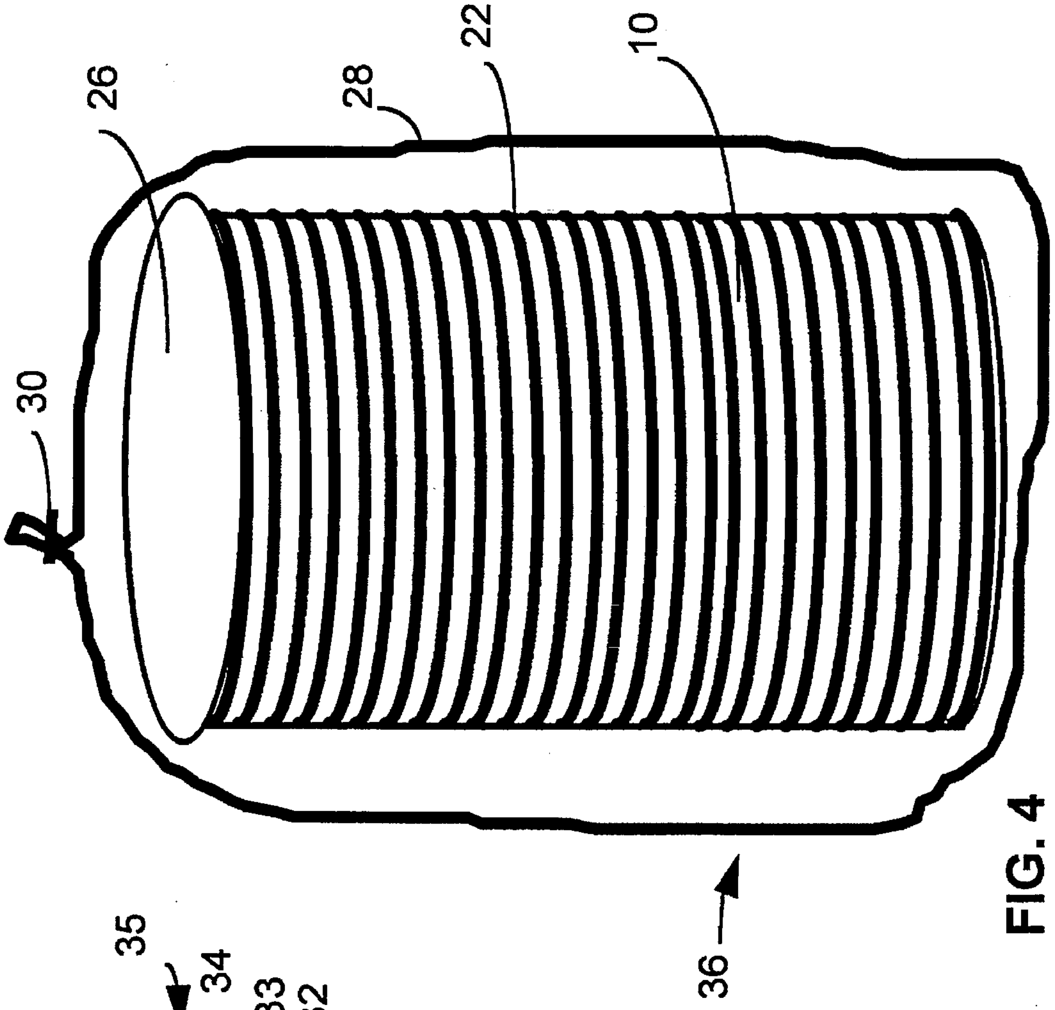
FIG. 4 is a perspective view showing the canister in a carrying case and showing a balloon attached to the top of the canister according to the present invention.

A deflated balloon 26 is sealed around the top 12 as shown in FIG. 4. The emergency signalling device 36, which consists of the canister having the wrapped cord and a deflated balloon 26, can be stowed in a bag 28 which is sealed by fastener 30. The bag 28 with the emergency signalling device 36 is of such a size that it is convenient for a person to carry. For example, the emergency signalling device can be carried by backpackers, campers, fishermen, hunters, hikers, and rescuers themselves who may at times get lost while trying to search for others. The emergency signalling device can also be carried in cars, boats and airplanes and used to summon rescuers in the event of an emergency.

Figures 5A, 5B:
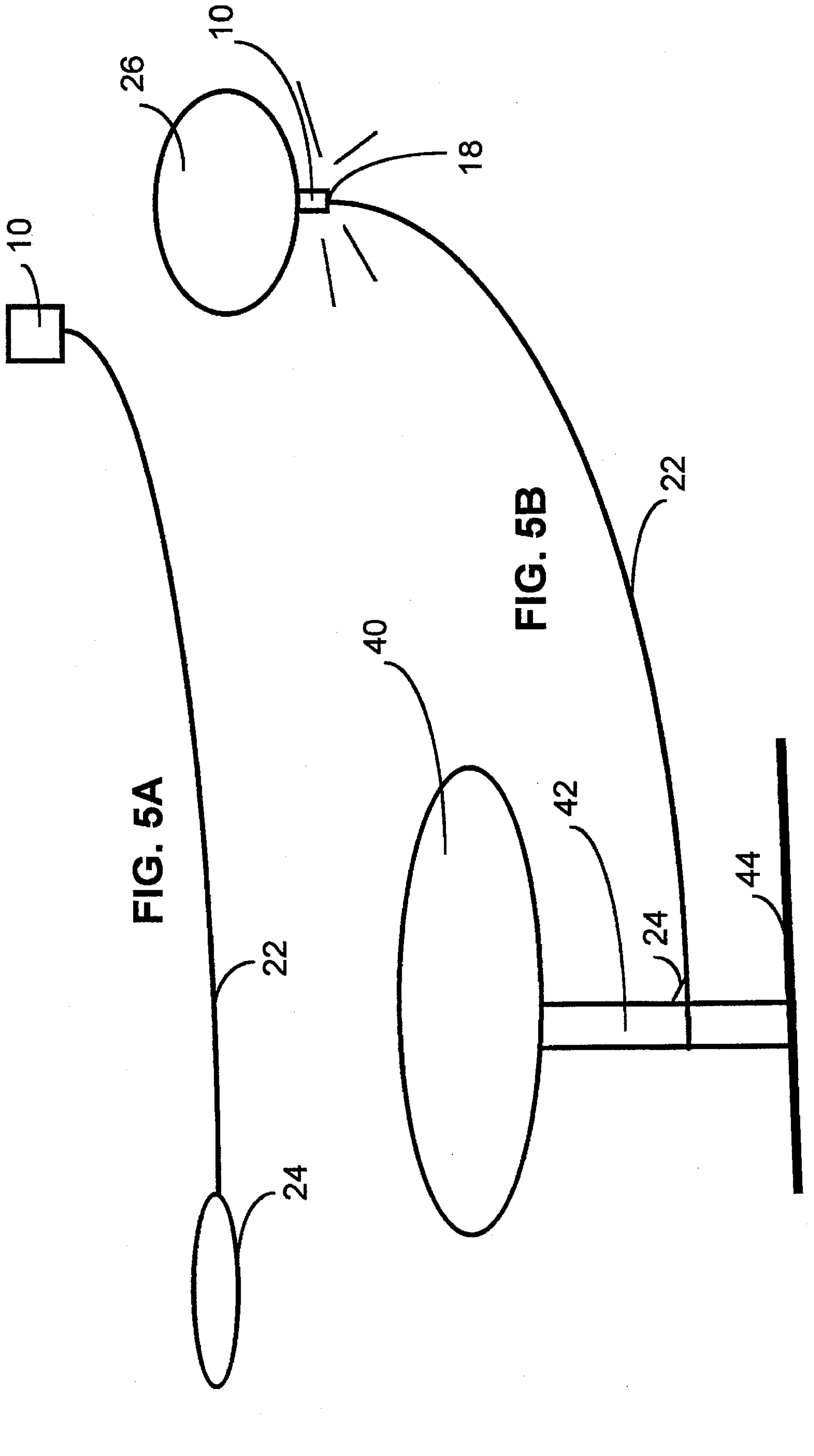
FIG. 5A shows the canister with the cord unwrapped and having a loop on the end according to the present invention.
FIG. 5B shows the cord attached to a stationary object and the balloon inflated with the canister attached and the signal device activated according to the present invention.

FIG. 5A shows a schematic of the canister 10 with the cord 22 unwrapped from the canister. The loop 24 at the end of cord 22 is also shown. To deploy the device, a person first activates a signal device 18 on the bottom of the canister by pushing button 20. Then the user removes loop 24 from the bottom of the canister and wraps the loop around a heavy object such as tree 40. The canister having the cord 22 still wrapped around the canister is then passed through the open loop 24 to anchor the emergency signalling device to the trunk 42 of the tree, for example, as shown in FIG. 5B. Then the user strikes the canister against a hard surface or pushes dome 16 down, which breaks the seal between canister 10 and the deflated balloon 26 along scoring 17, which is a weak point in the top 12 of the canister. The pressurized lighter than air gas inside the canister is released into the balloon, thereby inflating the balloon as shown in FIG. 5B. The cord 22 unwraps from the canister 10 as the balloon is released and rises.

When the emergency signalling device has been deployed as shown in FIG. 5B, the rescuers will be able to see the balloon 26 and the signal device 18. Mounting the signal device 18 on the bottom of the canister ensures that the signal device can be seen or heard. Ideally, the balloon is yellow in color and the cord is also yellow. To assist the user in finding the loop 24 on the end of the cord 22, the loop is ideally red in color. Furthermore, the button 20 on signal device 18 is ideally green in color.

Figure 6:
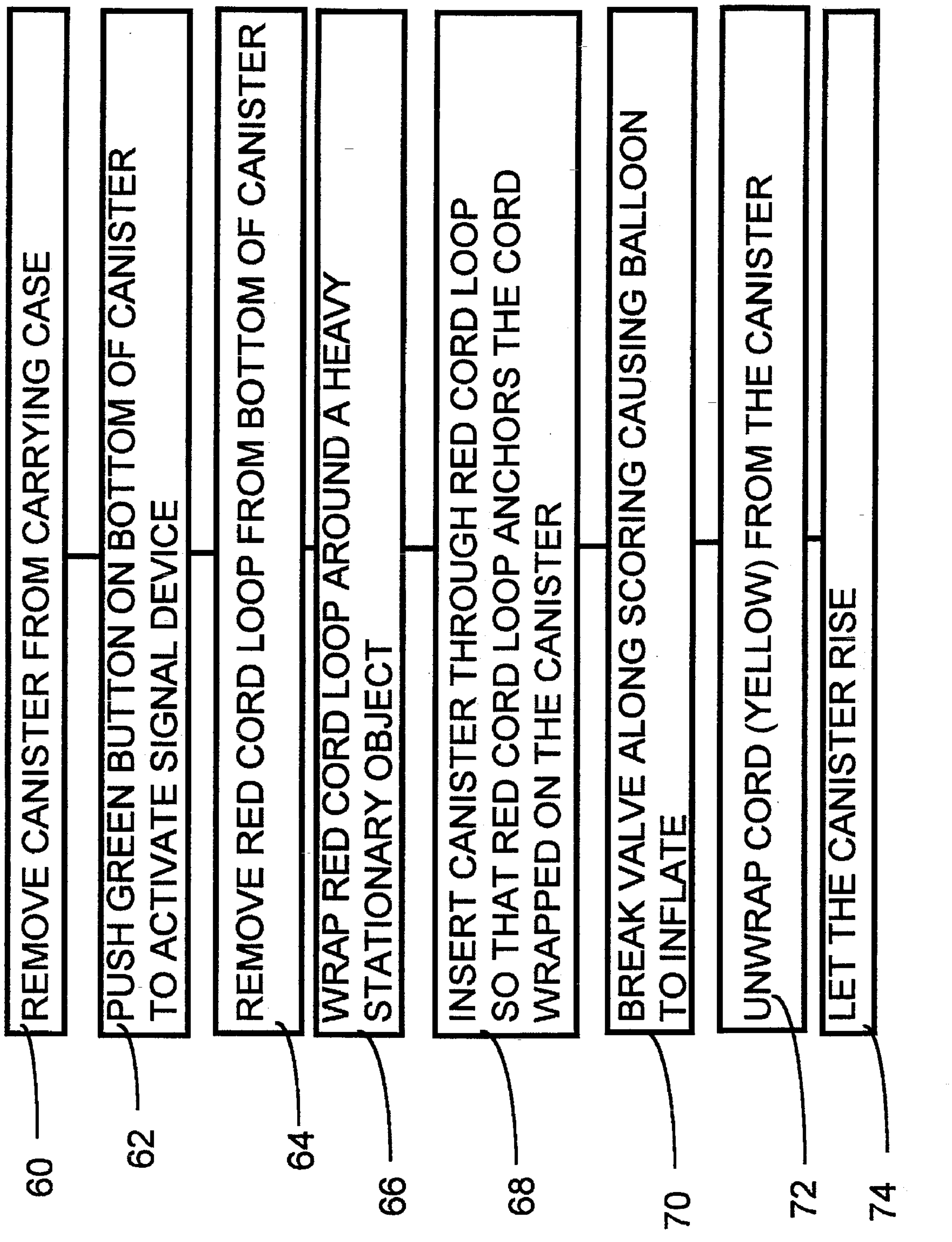
FIG. 6 is a flow diagram of a method for using the emergency signalling device according to the present invention.

FIG. 6 is a flow diagram of a method for using the emergency signalling device. First, the user removes the canister from the carrying case in step 60. Then in step 62 the user activates the signal device on the bottom of the canister by pressing green button 20. Then in step 64, the user removes red loop 24 from the bottom of the canister. Next in step 66, the user wraps the red loop around a heavy object such as a rock or a tree. Then the user in step 68 inserts the canister through the red loop so that the loop anchors the canister via the cord wrapped around the canister. Then the user in step 70 breaks the scoring 17 by striking the canister against a hard object or by pressing on dome 16. The lighter than air gas from the canister inflates the balloon causing the balloon to rise. The user in step 74 releases the balloon and the cord wrapped around the canister automatically unwinds as the balloon rises. Alternatively, the user can unwrap the cord completely from the canister 10 in step 72 before allowing the inflated balloon with the attached canister to rise. Unwrapping the cord first removes weight from the emergency signalling device, but the user needs to make sure to avoid catching the unwrapped cord on some obstacle.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. An emergency signalling device comprising:

a cylindrical canister having a top and a bottom, said canister pressurized with a quantity of a lighter than air gas;

a valve means on said top for sealing said gas;

an inflatable balloon sealed to said top covering said valve means;

a cord attached on a first end to said canister and wrapped around said canister in a plurality of layers of cord, said canister and said cord wrapped around said canister having a first diameter;

a waxy substance securing said cord to said canister and each layer of said cord to adjacent layers of said cord; and a loop forming a closed circle on a second end of said cord, said loop having a second diameter larger than said first diameter.

2. The emergency signalling device of claim 1 wherein the valve means on said top for sealing said gas comprises scoring on said top.

3. The emergency signalling device of claim 2 wherein said top is aluminum.

4. The emergency signalling device of claim 2 further comprising:

a dome on said top; and the scoring is around a base of the dome.

5. The emergency signalling device of claim 1 wherein said waxy substance is paraffin.

6. The emergency signalling device of claim 1 wherein said waxy substance is beeswax.

* * * * *